(12) United States Patent
Chen et al.

(10) Patent No.: US 12,339,831 B2
(45) Date of Patent: Jun. 24, 2025

(54) DATA PROCESSING METHOD AND DATA PROCESSING DEVICE

(71) Applicants: Inventec (Pudong) Technology Corp., Shanghai (CN); Inventec Corporation, Taipei (TW)

(72) Inventors: Wei-Chao Chen, Taipei (TW); Ming-Chi Chang, Taipei (TW); Ghih-Pin Wei, Taipei (TW); Shu-Huei Yang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 25 days.

(21) Appl. No.: 18/413,002

(22) Filed: Jan. 15, 2024

(65) Prior Publication Data
US 2025/0165457 A1 May 22, 2025

(30) Foreign Application Priority Data
Nov. 16, 2023 (CN) .......................... 202311536004.7

(51) Int. Cl.
*G06F 16/00* (2019.01)
*G06F 16/22* (2019.01)
*G06F 16/23* (2019.01)

(52) U.S. Cl.
CPC ...... *G06F 16/2365* (2019.01); *G06F 16/2282* (2019.01)

(58) Field of Classification Search
CPC .................. G06F 16/2365; G06F 16/2282
See application file for complete search history.

(56) References Cited

U.S. PATENT DOCUMENTS

| | | | | |
|---|---|---|---|---|
| 11,567,943 | B1* | 1/2023 | Blum | G06F 16/2443 |
| 2013/0124464 | A1* | 5/2013 | Rank | G06F 16/275 |
| | | | | 707/610 |
| 2022/0237213 | A1* | 7/2022 | Karlberg | G06F 16/1748 |
| 2024/0211217 | A1* | 6/2024 | Rasoulinejad | G06F 8/34 |

OTHER PUBLICATIONS

Tan et al., "A Column-Level Data Lineage Processing System Based on Hive", Sep. 2020, ACM, pp. 47-52 (Year: 2020).*

* cited by examiner

*Primary Examiner* — Alexander Khong
(74) *Attorney, Agent, or Firm* — Winston Hsu

(57) ABSTRACT

A data processing method applied in a data center is provided. The data processing method includes obtaining stored procedures of a development environment, a data quality assurance system environment and a production environment and column information of all tables, for each stored procedure, analyzing the stored procedure and determining whether the stored procedure contains a wildcard, converting and restoring the stored procedure into a restored stored procedure with complete column information based on the wildcard, generating column lineage graphs of the development environment, the data quality assurance system environment and the production environment respectively according to the restored stored procedures of the development environment, the data quality assurance system environment and the production environment, comparing the column lineage graphs of the development environment, the data quality assurance system environment and the production environment to generate a comparison result and performing a notification function according to the comparison result.

10 Claims, 8 Drawing Sheets

DATA PROCESSING METHOD AND DATA PROCESSING DEVICE

BACKGROUND OF THE INVENTION

1. Field of the Invention

The present invention relates to a data processing method and a data processing device, and more particularly, to a data processing method and a data processing device capable of offering real-time comparison of differences of column lineage relationships for different environments.

2. Description of the Prior Art

A data center usually includes tables and stored procedures. The table may be used as a data carrier, which provides the capability to store data. The logical relationships and conversion rules of data in tables are determined by the stored procedures. The table includes a plurality of columns. When a software engineer of the data center wants to add or delete columns in the table, the software engineer not only needs to modify the table specifications, but also must find all related stored procedures and perform programming operations. Due to the large number of stored procedures in the data center and the stored procedures are logically related to each other, when the software engineer of the data center adds or modifies the stored procedure, it may cause changes in the data center that affect the column lineage relationship between columns of the data center. In addition, the data center may have multiple tables having columns with the same name. Furthermore, a wildcard (e.g., represented by an asterisk (*)) is often used to mean match any column in the stored procedure in order to omit the program code of column names. However, the problems, such as columns with the same name but different meanings and the wildcard applied in the programming of the stored procedure, may greatly increase the difficulty for data center software engineers to add or query the related column logic of stored procedures. Conventional verification method is to conduct sampling verification on the data before modifying the stored procedure and the data after modifying the stored procedure. However, this verification method is not only time-consuming, but also cannot prove the correctness. Besides, in many cases, conventional method often relies on data users to find abnormality and feed error information back to the software engineer in the data center. But, wrong data may cause potential and invaluable losses to the company. As such, how to accurately modify the logic of stored procedures should be a very important issue. Further, with more and more stored procedures, the difficulty of accurately modifying stored procedures may increase and also affect the speed of digital transformation for the company. Thus, there is a need for improvement.

SUMMARY OF THE INVENTION

It is therefore a primary objective of the present invention to provide a data processing method and a data processing device capable of offering real-time comparison of differences of column lineage relationships for different environments, in order to resolve the aforementioned problems.

The present invention discloses a data processing method, applied in a data center, comprising: obtaining stored procedures of a development environment, a data quality assurance system environment and a production environment and column information of all tables from the data center; for each stored procedure, analyzing the stored procedure and determining whether the stored procedure contains a wildcard; for each stored procedure, converting and restoring the stored procedure into a restored stored procedure with complete column information based on the wildcard; generating column lineage graphs of the development environment, the data quality assurance system environment and the production environment respectively according to the restored stored procedures of the development environment, the data quality assurance system environment and the production environment; and comparing the column lineage graphs of the development environment, the data quality assurance system environment and the production environment to generate a comparison result and performing a notification function according to the comparison result.

The present invention further discloses a data processing device, applied in a data center, comprising: a storage device, configured to store instructions; a processor circuit, configured to execute the instructions of: obtaining stored procedures of a development environment, a data quality assurance system environment and a production environment and column information of all tables from the data center; for each stored procedure, analyzing the stored procedure and determining whether the stored procedure contains a wildcard; for each stored procedure, converting and restoring the stored procedure into a restored stored procedure with complete column information based on the wildcard; generating column lineage graphs of the development environment, the data quality assurance system environment and the production environment respectively according to the restored stored procedures of the development environment, the data quality assurance system environment and the production environment; and comparing the column lineage graphs of the development environment, the data quality assurance system environment and the production environment to generate a comparison result and performing a notification function according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

The embodiments of the present invention may be applied to a data center or a database system. In order to prevent errors caused by addition and modification of stored procedures, the embodiments of the present invention may establish a development environment, a data quality assurance (QAS) system environment and a production environment in the data center. The development environment may be utilized to add and modify the stored procedures, and ensure that the amended stored procedures are able to be executed normally and there is no coding error in the programs of the stored procedures. In the development environment, developers or software engineers may load original data and stored procedures, and modify the stored procedures according to requirements. After the stored procedures are amended, the updated version data and stored procedures of the development environment may be copied to the data quality assurance system environment. The data quality assurance system environment may provide data users to identify whether the data changes after adding or modifying stored procedures meet the requirements. In the data quality assurance system environment, data users may utilize various test methods to test, so as to determine whether the data changes meet the requirements. As data users perform testing and find any flaw or defect in the data quality assurance system environment, the problems found in the data quality assurance system environment may be solved by the developer or software engineer in the development environment, and the processed (the latest updated version) data and stored procedures of the development environment may be copied to the data quality assurance system environment. Similarly, the data users may perform related testing again in the data quality assurance system environment until the expected result is available or no problem has occurred. The production environment is the actual operational data center environment where the application is finally deployed and made available to data users. Therefore, when the data quality assurance system environment completes the data user testing task and verifies that the change of data meets the requirements, the developer or software engineer of the data center may update and deploy the production environment to the latest newly version of the modified stored procedures.

Figure 1:
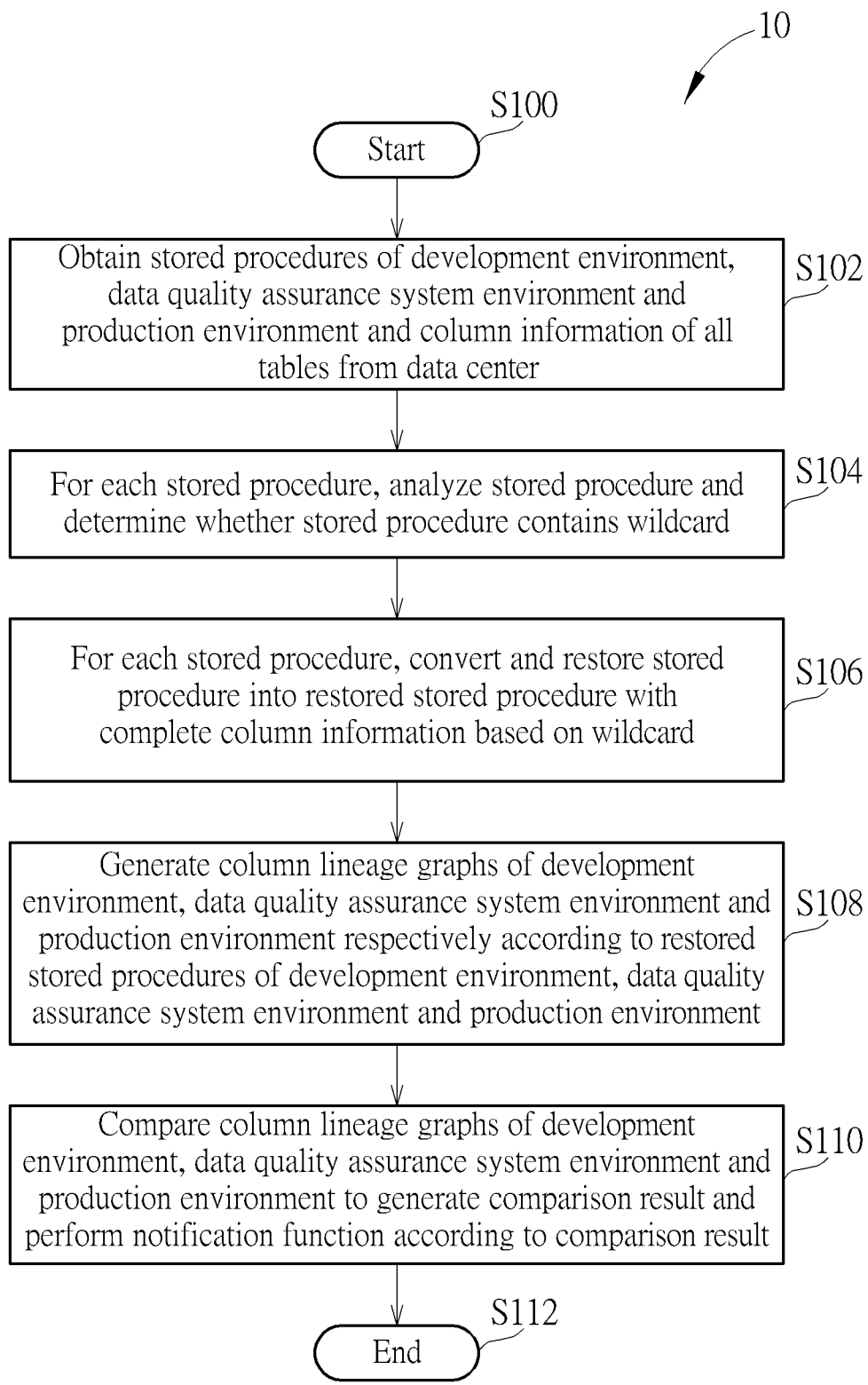
FIG. 1 is a flow diagram of a procedure according to an embodiment of the present invention.

Please refer to FIG. 1. FIG. 1 is a flow diagram of a procedure 10 according to an embodiment of the present invention. The procedure 10 includes the following steps:

Step S100: Start.

Step S102: Obtain stored procedures of a development environment, a data quality assurance system environment and a production environment and column information of all tables from the data center.

Step S104: For each stored procedure, analyze the stored procedure and determine whether the stored procedure contains a wildcard.

Step S106: For each stored procedure, convert and restore the stored procedure into a restored stored procedure with complete column information based on the wildcard.

Step S108: Generate column lineage graphs of the development environment, the data quality assurance system environment and the production environment respectively according to the restored stored procedures of the development environment, the data quality assurance system environment and the production environment.

Step S110: Compare the column lineage graphs of the development environment, the data quality assurance system environment and the production environment to generate a comparison result and perform a notification function according to the comparison result.

Step S112: End.

According to the procedure 10, in Step S102, the embodiments of the present invention may obtain stored procedures of the development environment, the data quality assurance system environment and the production environment from the data center. The embodiments of the present invention may also obtain column information of all tables from the data center.

Software engineers often use wildcards to perform actions of selecting all columns in a table during stored procedure programming. However, using the wildcard in the stored procedure makes it impossible to accurately identify all the column information represented by the wildcard during the stored procedure parsing process. As such, some columns represented by the wildcard may be ignored during the stored procedure parsing process, thus resulting in incorrect column lineage relationship parsing. In Step 104, for each stored procedure in the development environment, the data quality assurance system environment and the production environment, the program code of the stored procedure may be analyzed and determined whether the stored procedure contains a wildcard. For example, a wildcard may be represented by an asterisk "*", but not limited thereto. When determining that there is a wildcard in the program code of the stored procedure, Step 106 is executed. When determining that no wildcard is in the program code of the stored procedure, there is no need to modify the stored procedure and the stored procedure may be directly outputted for acting as the restored stored procedure.

Figure 2:
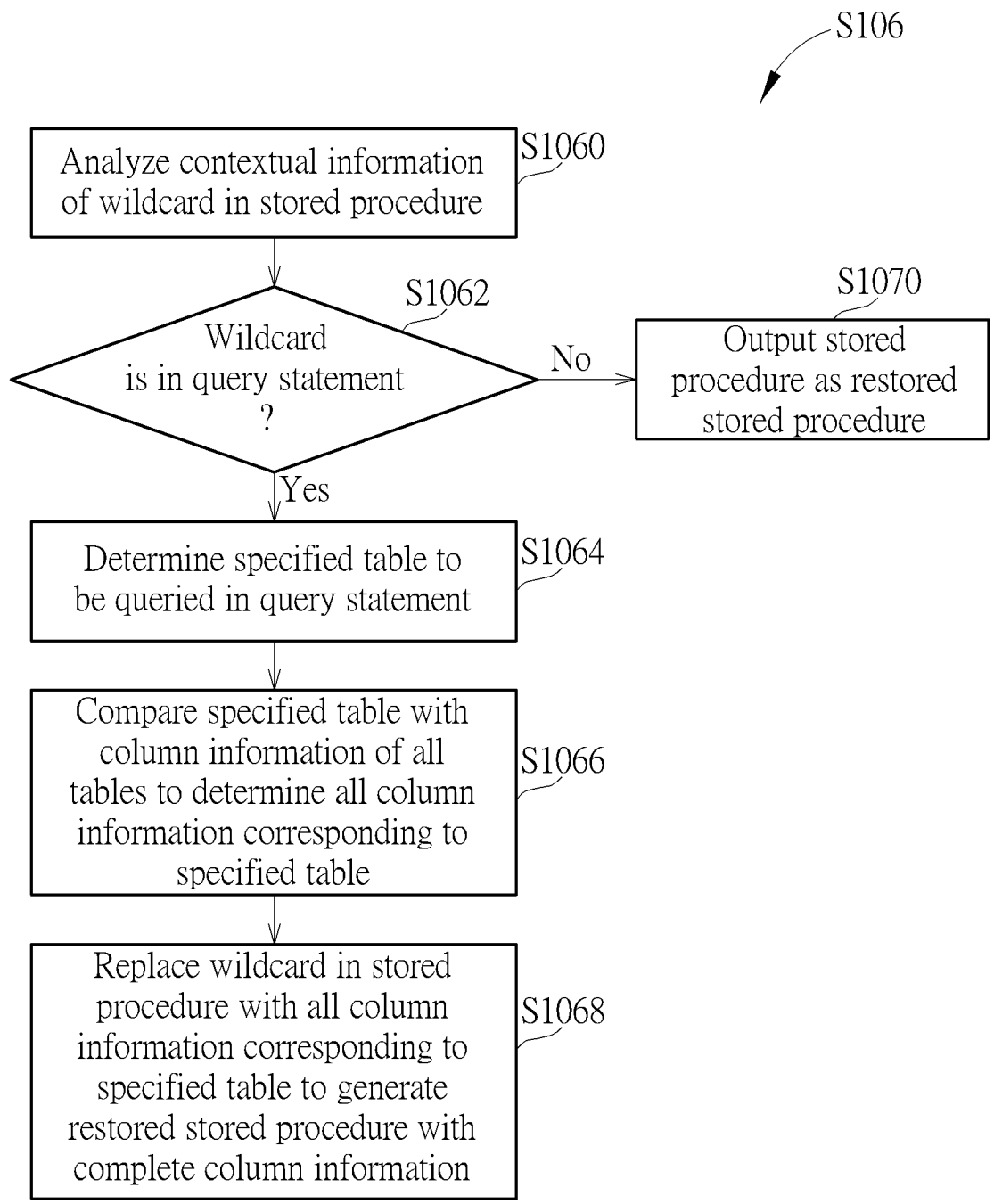
FIG. 2 is a flow diagram of a procedure for converting and restoring the stored procedure into the restored stored procedure with complete column information based on the wildcard according to an embodiment of the present invention.

In Step 106, for each stored procedure of the development environment, the data quality assurance system environment and the production environment, the stored procedure may be converted and restored into a restored stored procedure with complete column information based on the wildcard. Regarding the detailed operation method of converting and restoring the stored procedure into the restored stored procedure with complete column information based on the wildcard, please refer to FIG. 2. In Step 1060, for each stored procedure, when determining that the stored procedure contains a wildcard, the embodiments may analyze contextual information of the wildcard in the stored procedure. Further, in Step 1062, the embodiments may determine whether the wildcard is included in a query statement based on the contextual information of the wildcard in the stored procedure. When determining that the wildcard is in a query statement, Step 1064 is executed. When determining that the wildcard is not in any query statement, Step 1070 is executed.

For example, the query statement may be a SELECT statement (selection query statement), an UPDATE statement, a WHERE statement, or an ORDER statement, but not limited thereto. For example, please refer to FIG. 3. The syntax of a SELECT statement 300 may be shown in the upper half of FIG. 3. The SELECT statement 300 includes a first clause 302 starting with a SELECT command (also called SELECT clause) and a second clause 304 starting with the FROM command (also called FROM clause). The second clause 304 follows the first clause 302. The term "SELECT" in the first clause 302 represents a SELECT command. The term "FROM" in the second clause 304 represents a FROM command. The first clause 302 starting with the SELECT command may be utilized to indicate which column information to be returned in this query. The second clause 304 starting with the FROM command is utilized to indicate which table to be queried from (hereinafter referred to as specified table). In an embodiment, in Step S1062, the embodiments may determine whether there is a program code that conforms to the query statement format in the context of the wildcard. For example, as shown in the upper half of FIG. 3, the embodiments may analyze contextual information of the wildcard. Based on determining that there is a wildcard "*" in the program code of the stored procedure, and there is a first clause 302 starting with a SELECT command and a second clause 304 starting with the FROM command in the context of the wildcard, the embodiments may determine that the combination of the first clause 302 and the second clause 304 is a SELECT statement 300. Therefore, the wildcard "*" may be determined to be in the SELECT statement 300 since the wildcard "*" is in the first clause 302 of the SELECT statement 300.

Figures 3, 4:
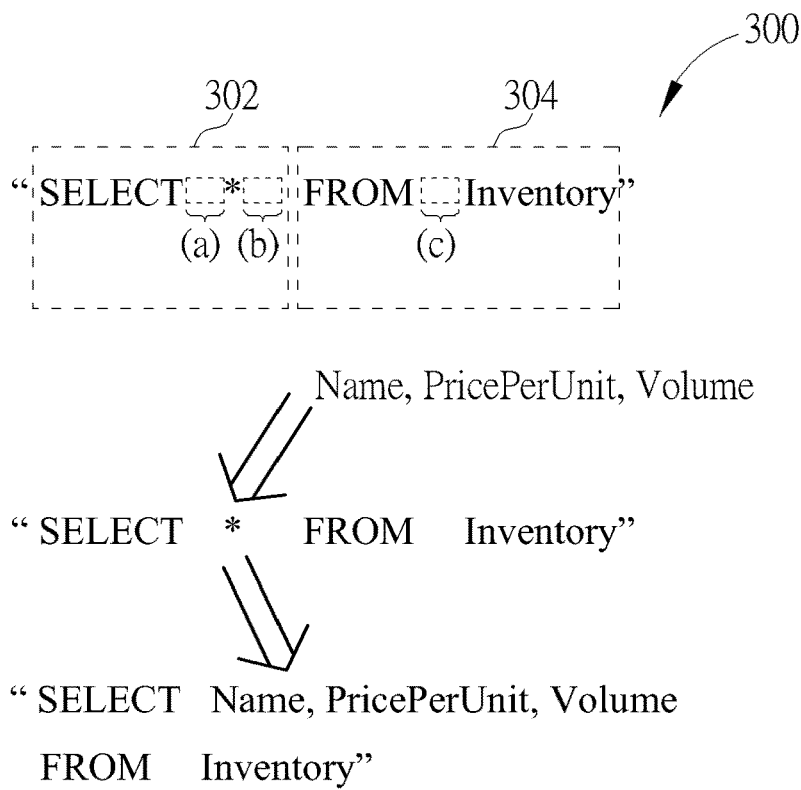
FIG. 3 is a schematic diagram illustrating converting the wildcard into complete column information according to an embodiment of the present invention.
FIG. 4 is a schematic diagram illustrating an embodiment of the wildcard which is not used to represent column information according to an embodiment of the present invention.

In another embodiment, please further refer to FIG. 3. The embodiments may determine whether there is a wildcard "*" in the program code of the stored procedure, whether there is a SELECT command before the wildcard "*" and whether there is a FROM command after the wildcard "*". Based on determining that a wildcard "*" is in the program code of the stored procedure, a SELECT command is before the wildcard "*" and a FROM command is after the wildcard "*", the embodiments may further determine whether there is more than one space after the SELECT command, whether there is more than one space after the wildcard "*", and whether there is more than one space after the FROM command. When determining that there is more than one space after the SELECT command, there is more than one space after the wildcard "*", and there is more than one space after the FROM command, it is determined that the wildcard "*" is located in a query statement accordingly.

In another embodiment, please further refer to FIG. 3. When determining that there is a wildcard "*" in the program code of the stored procedure, there is a SELECT command before the wildcard "*", and there is a FROM command after the wildcard "*", the embodiments may further determine whether there is more than one space and other symbols (or commands) between the SELECT command and the wildcard "*" (i.e. part (a) shown in the upper half of FIG. 3). The SELECT command and FROM command may be case insensitive. The symbols may include any cursor control symbols such as \n, \r, or \t. The commands may include stored procedure-specific commands for filtering the number of row data, such as DISTINCT (case-insensitive) and TOP (case-insensitive). The embodiments may determine whether there is more than one space and other symbols (or commands) between the wildcard "*" and the FROM command (i.e. part (b) shown in the upper half of FIG. 3). The embodiments may determine whether there is more than one space and other symbols (or commands) between the FROM command and the subsequent table name (i.e. part (c) shown in the upper half of FIG. 3). If the determination results are all yes, it is determined that the wildcard "*" is located in a query statement.

In step 1062, after determining that the wildcard is located in a query statement, the embodiments may further determine whether the wildcard "*" in the query statement is related to column information of a table. When determining that the wildcards is irrelevant to any column information, there is no need to modify the stored procedure, Step 1070 is executed and the stored procedure is outputted for acting as the restored stored procedure. For example, for a selection statement 400 shown in FIG. 4, when determining that the wildcard "*" is in the first clause starting with the SELECT command, the embodiments may further determine whether the wildcard "*" is related to column information. If it is determined that the wildcard "*" is used to indicate a multiplication operation in the selection query statement. For example, it is determined that the term "PricePerUnit*Volume AS Amount" in the SELECT clause of the selection statement means that the value "Amount" of each column is the result of multiplying the column value "PricePerUnit" by the column value "Volume" of each column. As such, the wildcard "*" in the selection statement is determined to be used for multiplication and irrelevant to column information, and thus the stored procedure does not need to be modified. Further, Step 1070 is executed and the stored procedure is outputted for acting as the restored stored procedure.

In Step 1064, based on determining that the wildcard is in the query statement, the embodiments may determine a specified table to be queried and retrieved according to contents of the query statement. For example, as shown in FIG. 3, the statement content following the part (C) in the second clause 304 of the SELECT statement 300 specifies an Inventory table named "Inventory". Based on determining that the wildcard "*" is located in the SELECT statement 300 in Step 1062, the specified table that is to be queried by the query statement may be determined as Inventory table since the Inventory table is listed in the second clause 304 of the SELECT statement 300.

In Step 1066, the embodiments may compare the specified table with the obtained column information of all tables to determine all column information corresponding to the specified table. The embodiments may analyze and query whether the column information of all tables obtained from the data center includes all column information of the specified table. If it is determined that the column information of all tables obtained from the data center includes all column information of the specified table, the embodiments may read all the column information corresponding to the specified table. For example, the column information of all tables obtained from the data center includes the column information of Inventory table, including Name column, PricePerUnit column and Volume column. As such, when determining that the specified table is Inventory table in Step 1064, the column information of all tables obtained from the data center may be queried to determine all the column information corresponding to the specified table (e.g., Inventory table including Name column, PricePerUnit column and Volume column).

In Step 1068, the wildcard in the stored procedure may be replaced with all column information corresponding to the specified table so as to generate a restored stored procedure with complete column information. For example, the wildcard in the stored procedure may be replaced with all column information corresponding to the specified table according to coding rules of the stored procedure so as to generate a restored stored procedure with complete column information. For example, please further refer to FIG. 3. As shown in the lower side of FIG. 3, the Name column, PricePerUnit column, and Volume column may be concatenated to create a string and the wildcard "*" in the first clause 302 of the SELECT statement 300 may be replaced with the created string, so as to generate a restored stored procedure with complete column information. As a result, the all column information corresponding to the Inventory table (i.e. Name, PricePerUnit and Volume) may be clearly presented in the SELECT statement 300, such that correct information of column lineage relationship can be provided for subsequent column lineage parsing process. In other words, since it is impossible to identify all the column information represented by wildcards while parsing the stored procedure, column lineage relationship cannot be obtained by simply parsing the stored procedure. In embodiments of the present invention, the original stored procedure using the wildcard may be converted into the restored stored procedure with complete column information in Step S106. For the following column lineage parsing process, no columns will be ignored, such that column lineage relationship may be parsed correctly during the column lineage parsing process.

In Step S106, the stored procedures of the development environment, the data quality assurance system environment and the production environment may be converted into the restored stored procedures with complete column information. After that, in Step S108, the column lineage graphs of the development environment, the data quality assurance system environment and the production environment may be generated respectively according to the restored stored procedures of the t development environment, the data quality assurance system environment and the production environment. In an embodiment, the column lineage graph of the development environment may be generated according to all the restored stored procedures of the development environment. Each restored stored procedure of the development environment may be parsed to determine a directed graph of the column of the restored stored procedure. For example, a stored procedure parser engine may be utilized to parse the restored stored procedure and accordingly generate a directed graph of the column of the stored procedure. For example, a SQL parser engine of software Python may be utilized to parse the restored stored procedure and generate a corresponding directed graph of the column of the stored procedure. Each stored procedure may include at least one source column and at least one target column. Each stored procedure may merely include at least one source column. Each stored procedure may merely include at least one target column. The directed graph of the column of the stored procedure may include nodes representing source columns and/or target columns. The directed graph of the column of the stored procedure may include directed edges representing the stored procedures. The direction of the directed edge is from a source column of the stored procedure to a target column of the stored procedure. Each column of the stored procedure may correspond to at least one directed graph.

Figure 5:
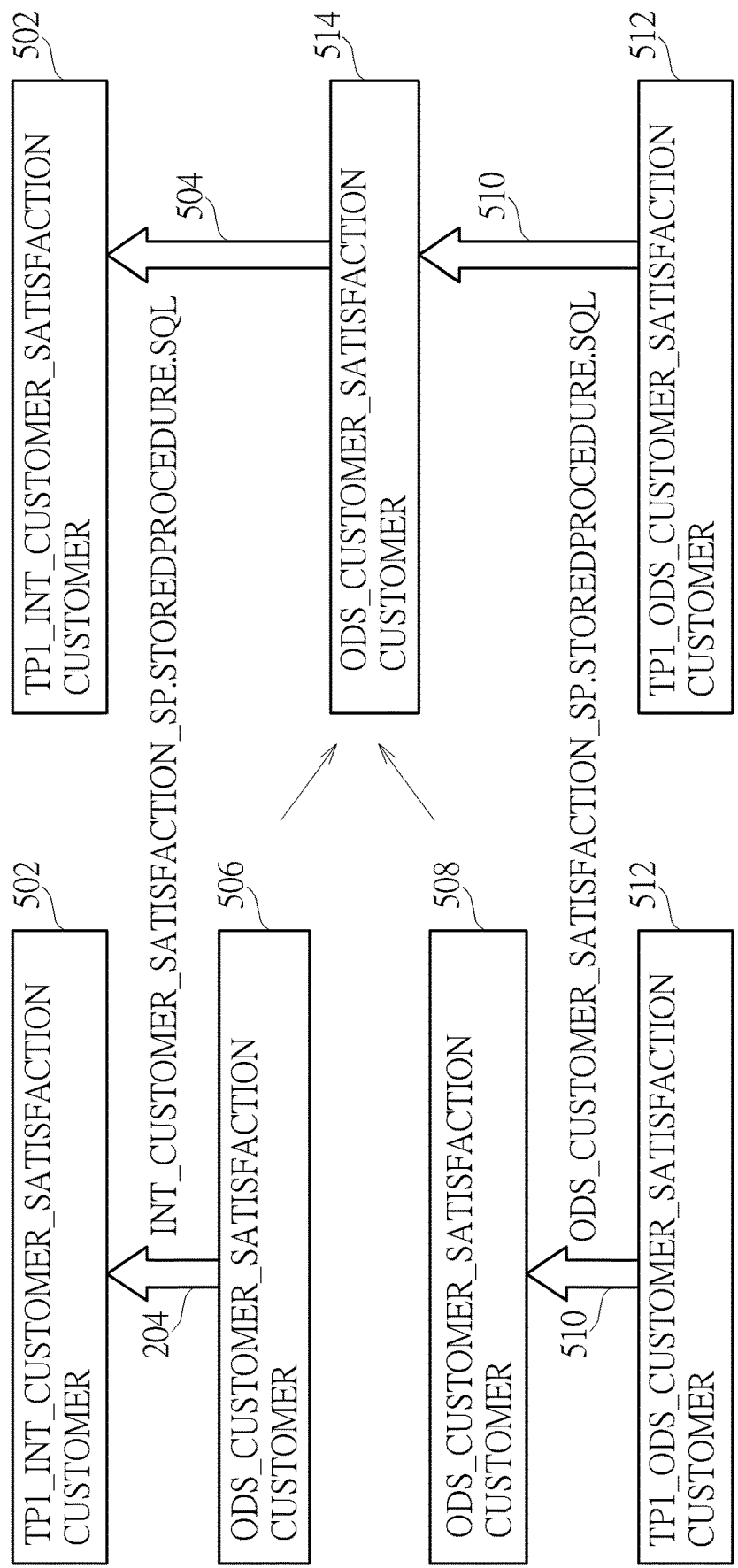
FIG. 5 is a schematic diagram illustrating directed graphs of the restored stored procedures according to an embodiment of the present invention.

For example, please refer to FIG. 5. As shown in the upper left side of FIG. 5, a first restored stored procedure is named "INT_CUSTOMER_SATISFACTION_SP.STOREDPROCEDURE.SQL". A directed graph of the column of the first restored stored procedure includes nodes 502 and 506, and a directed edge 504. The node 502 represents a target column of the first restored stored procedure. As shown in the upper left side of FIG. 5, the target column of the first restored stored procedure is named "TP1_INT_CUSTOMER_SATISFACTION.CUSTOMER". The node 506 represents a source column of the first restored stored procedure. The source column of the first restored stored procedure is named "ODS_CUSTOMER_SATISFACTION.CUSTOMER". The directed edge 504 represents the first restored stored procedure, and the direction of the directed edge 504 is from the node 506 of the source column to the node 502 of the target column. Moreover, as shown in the bottom left side of FIG. 5, a second restored stored procedure is named "ODS_CUSTOMER_SATISFACTION_SP.STOREDPROCEDURE.SQL". A directed graph of the column of the second restored stored procedure includes nodes 508 and 512, and a directed edge 510. The node 508 represents a target column of the second restored stored procedure. As shown in the bottom left side of FIG. 5, the target column of the second restored stored procedure is named "ODS_CUSTOMER_SATISFACTION.CUSTOMER". The node 512 represents a source column of the second restored stored procedure. The source column of the second restored stored procedure is named "TP1_ODS_CUSTOMER_SATISFACTION.CUSTOMER". The directed edge 510 represents the second restored stored procedure, and the direction of the directed edge 510 is from the node 512 of the source column to the node 508 of the target column.

Figure 6:
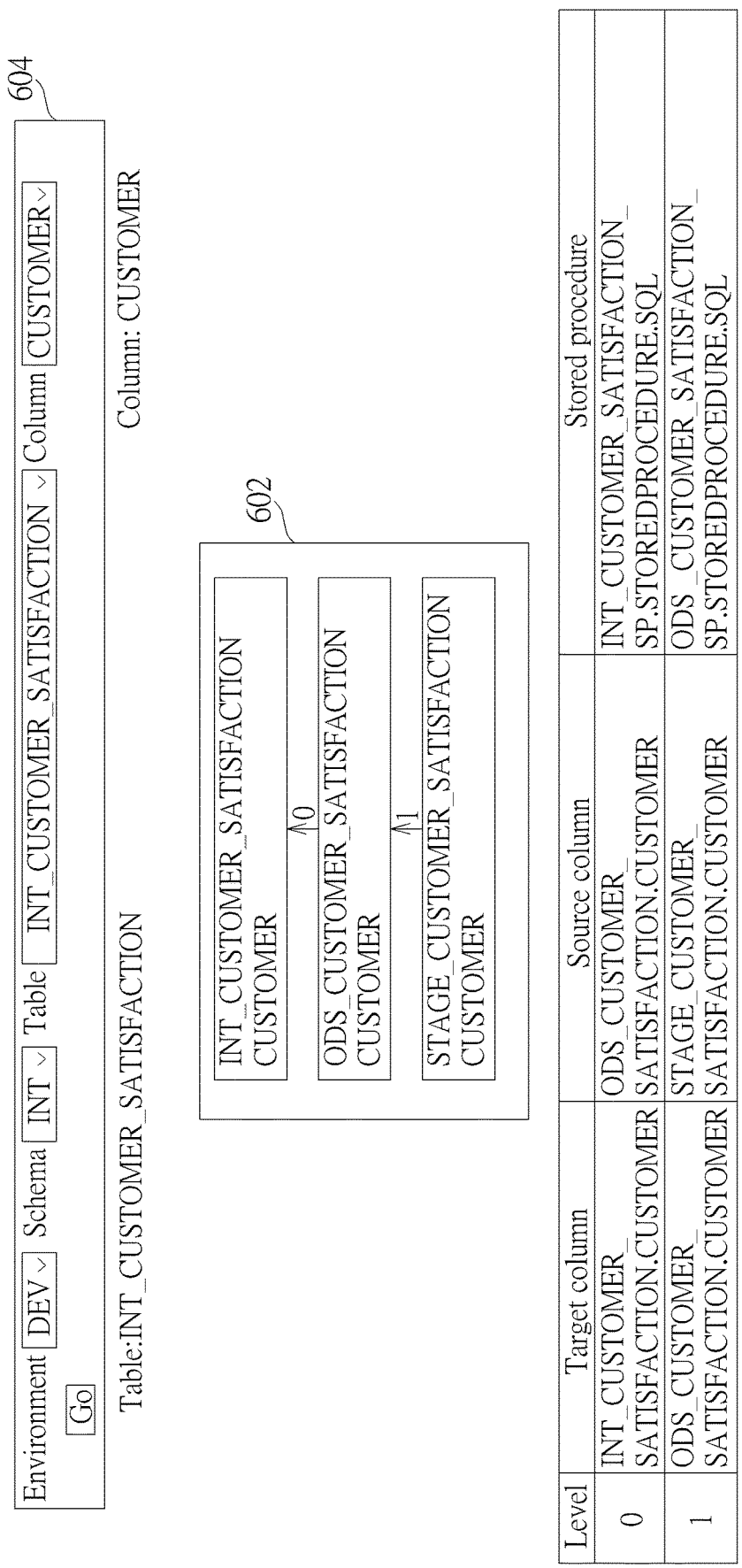
FIG. 6 is a schematic diagram illustrating the source directed subgraph of the column lineage graph according to an embodiment of the present invention.
Figure 7:
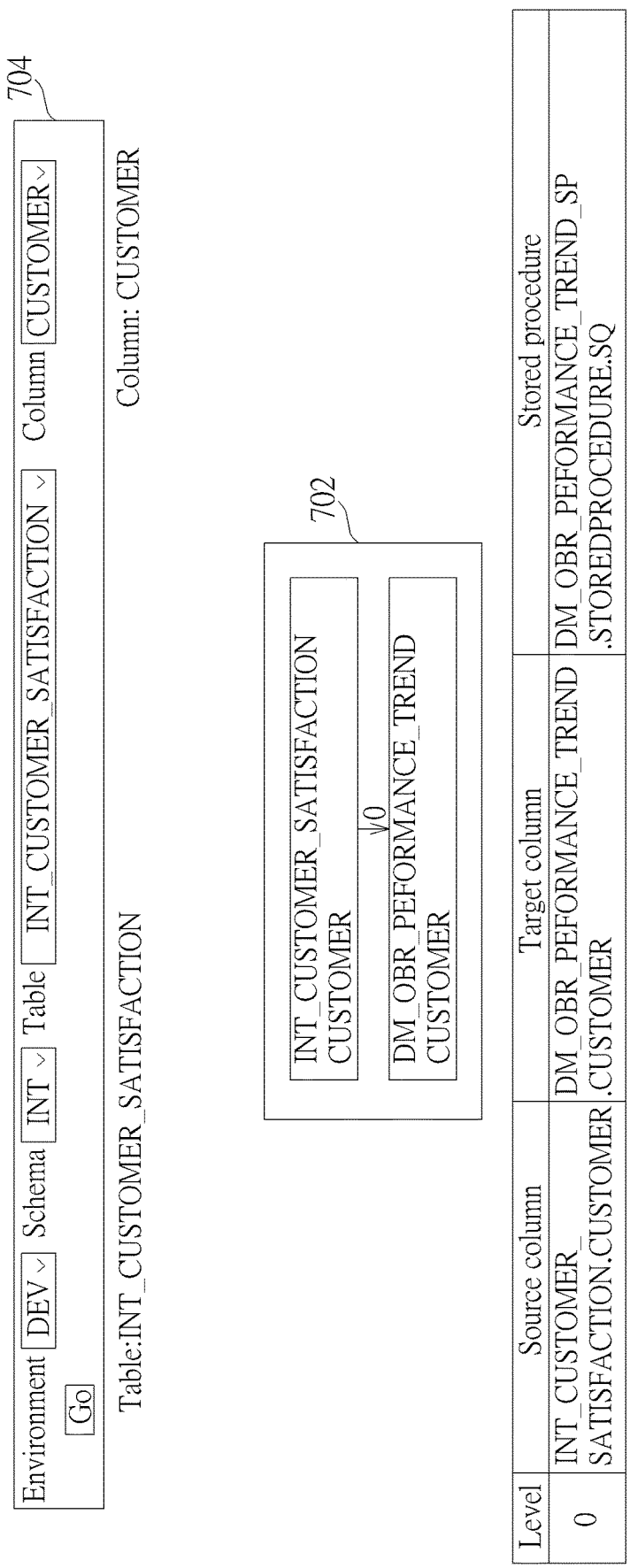
FIG. 7 is a schematic diagram illustrating the target directed subgraph of the column lineage graph according to an embodiment of the present invention.

In Step S108, the column lineage graph of the development environment may be generated by merging the directed graphs of the columns of all restored stored procedures in the development environment after the directed graphs of the columns of all restored stored procedures of the development environment has been parsed. The column lineage graph may represent the relationship between columns. For example, the embodiments may compare the directed graphs of columns of all restored stored procedures in the development environment. For example, when determining that a source column of a restored stored procedure in the development environment and a target column of other restored stored procedure in the development environment are the same column, a node representing the source column of the restored stored procedure and a node representing the target column of other restored stored procedure may be merged to form a corresponding column lineage graph. For example, as shown in the left side of FIG. 5, when determining that the source column of the first restored stored procedure and the target column of the second restored stored procedure are the same column (i.e. column "ODS_CUSTOMER_SATISFACTION.CUSTOMER" of nodes 506 and 508), the nodes 506 and 508 may be merged to form a new node 514, so as to combine the two directed graphs to form a part of the column lineage graph. In such a situation, the node 514 is utilized to represent the source column of the first restored stored procedure and the target column of the second restored stored procedure, and thus the directed graph of the column of the first restored stored procedure and the directed graph of the column of the second restored stored procedure are connected and merged accordingly. Through the merging method, the directed graphs of columns of all stored procedure in the development environment may be merged and converted into the column lineage graph of the development environment. The column lineage graph may include at least one source directed subgraph and/or at least one target directed subgraph. The source directed subgraph may be a directed subgraph ending in a specific column. The target directed subgraph may be a directed subgraph starting from a specific column. In an embodiment, please refer to FIG. 6. FIG. 6 is a schematic diagram of a source directed subgraph in the column lineage graph according to an embodiment of the present invention. The middle of FIG. 6 shows a source directed subgraph 602 corresponding to a column named "INT_CUSTOMER_SATISFACTION.CUSTOMER". In the source directed subgraph 602, node a representing the column "INT_CUSTOMER_SATISFACTION.CUSTOMER" is the ending point. As shown in the middle of FIG. 6, the source directed subgraph 602 includes parent nodes associated with the column "INT_CUSTOMER_SATISFACTION.CUSTOMER". In an embodiment, please refer to FIG. 7. FIG. 7 is a schematic diagram of a target directed subgraph in the column lineage graph according to an embodiment of the present invention. The middle of FIG. 7 shows a target directed subgraph 702 corresponding to a column named "INT_CUSTOMER_SATISFACTION. CUSTOMER". In the target directed subgraph 702, a node representing the column "INT_CUSTOMER_SATISFACTION. CUSTOMER" is the starting point. As shown in the middle of FIG. 7, the target directed subgraph 702 includes child nodes associated with the column "INT_CUSTOMER_SATISFACTION. CUSTOMER".

Similarly, according to the aforementioned method of generating the column lineage graph of the development environment, the column lineage graph of the data quality assurance system environment may be generated according to the restored stored procedures of the data quality assurance system environment. The directed graphs of columns of each restored stored procedure may be determined by parsing each restored stored procedure of the data quality assurance system environment, and the directed graphs of columns of all restored stored procedures in the data quality assurance system environment may be merged to generate the column lineage graph of the data quality assurance system environment after parsing the directed graphs of columns of all restored stored procedures in the data quality assurance system environment. Similarly, the column lineage graph of the production environment may be generated according to the restored stored procedures of the production environment. The directed graphs of columns of each restored stored procedure may be determined by parsing each restored stored procedure of the production environment, and the directed graphs of columns of all restored stored procedures in the production environment may be merged to generate the column lineage graph of the production environment after parsing the directed graphs of columns of all restored stored procedures in the production environment.

In an embodiment, after generating the column lineage graphs of the development environment, the data quality assurance system environment and the production environment, an input menu may be generated for the user to input and select. For example, please further refer to FIG. 6 and FIG. 7. Input menus 604 and 704 may be generated. The user may utilize the input menu to select the desired environment types, table types (or called schemas), table names, column names, and so on. For example, the user may click the item "DEV" in the field of the environment type to select the development environment, click the item "INT" in the field of table type to select the INT table, click the item "INT_CUSTOMER_SATISFACTION" in the field of table name to select the table named "INT_CUSTOMER_SATISFACTION", and click the item "CUSTOMER" in the field of column name to select the column "CUSTOMER". In an embodiment, the input menu may be visually displayed for the user to view and input the item to be selected, and the related information of the selected column lineage graph may be visually displayed. As shown in FIG. 6 and FIG. 7, the embodiment may visualize the input menu for the user to view and input the desired item, and visualize the contents of the directed subgraphs of the selected column, the corresponding restored stored procedures, the source columns and the target columns. Therefore, the user, e.g., administrator or engineer of the data center, may quickly and accurately get the relationship information of data structure of restored stored procedures in the corresponding environment.

In Step S110, the embodiments may compare the column lineage graphs of the development environment, the data quality assurance system environment and the production environment to generate a comparison result and perform a notification function according to the comparison result. For example, the embodiments may compare the column lineage graphs of at least two environments among the development environment, the data quality assurance system environment and the production environment to generate the comparison result. For example, the embodiments may compare the column lineage graph of the development environment with the column lineage graph of the data quality assurance system environment to generate the comparison result. For example, the embodiments may compare the column lineage graph of the data quality assurance system environment with the column lineage graph of the production environment to generate the comparison result. For example, the embodiments may compare the column lineage graph of the development environment with the column lineage graph of the production environment to generate the comparison result. In addition, the embodiments may also select specific columns to compare to generate the comparison results. For example, the embodiments may compare source directed subgraphs or target directed subgraphs corresponding to at least one column in the column lineage graphs of at least two environments among the development environment, the data quality assurance system environment and the production environment to generate the comparison result. The table schemas may include DM table, INT table, ODS table, STAGE table. A table whose name is prefixed with DM is called a DM table (e.g., a table named "DM XXXX"). A table whose name is prefixed with INT is called an INT table, and the like. The DM table is usually located at the end of the table lineage graph. Since the DM table is usually the endpoint table in the lineage graph, if there is a difference or any inconsistency between the two environments, the difference may be quickly and easily detected by comparison. In an embodiment, the embodiments may compare the source directed subgraph corresponding to a DM table of the column lineage graph of any two environments in the development environment, the data quality assurance system environment and the production environment to generate the comparison result.

Figure 8:
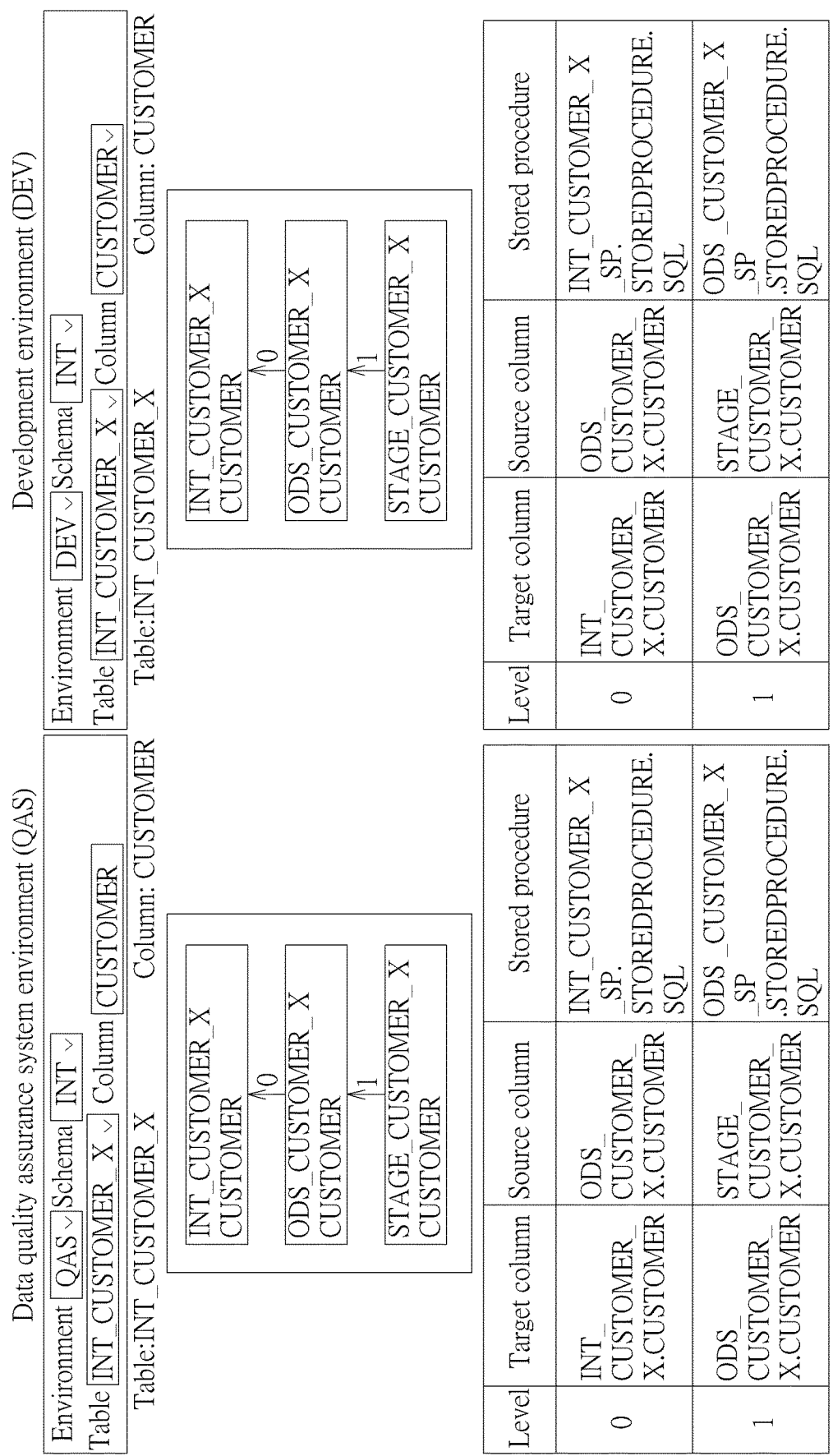
FIG. 8 is a schematic diagram illustrating comparison of column lineage graphs of the development environment and the data quality assurance system environment according to an embodiment of the present invention.
Figure 9:
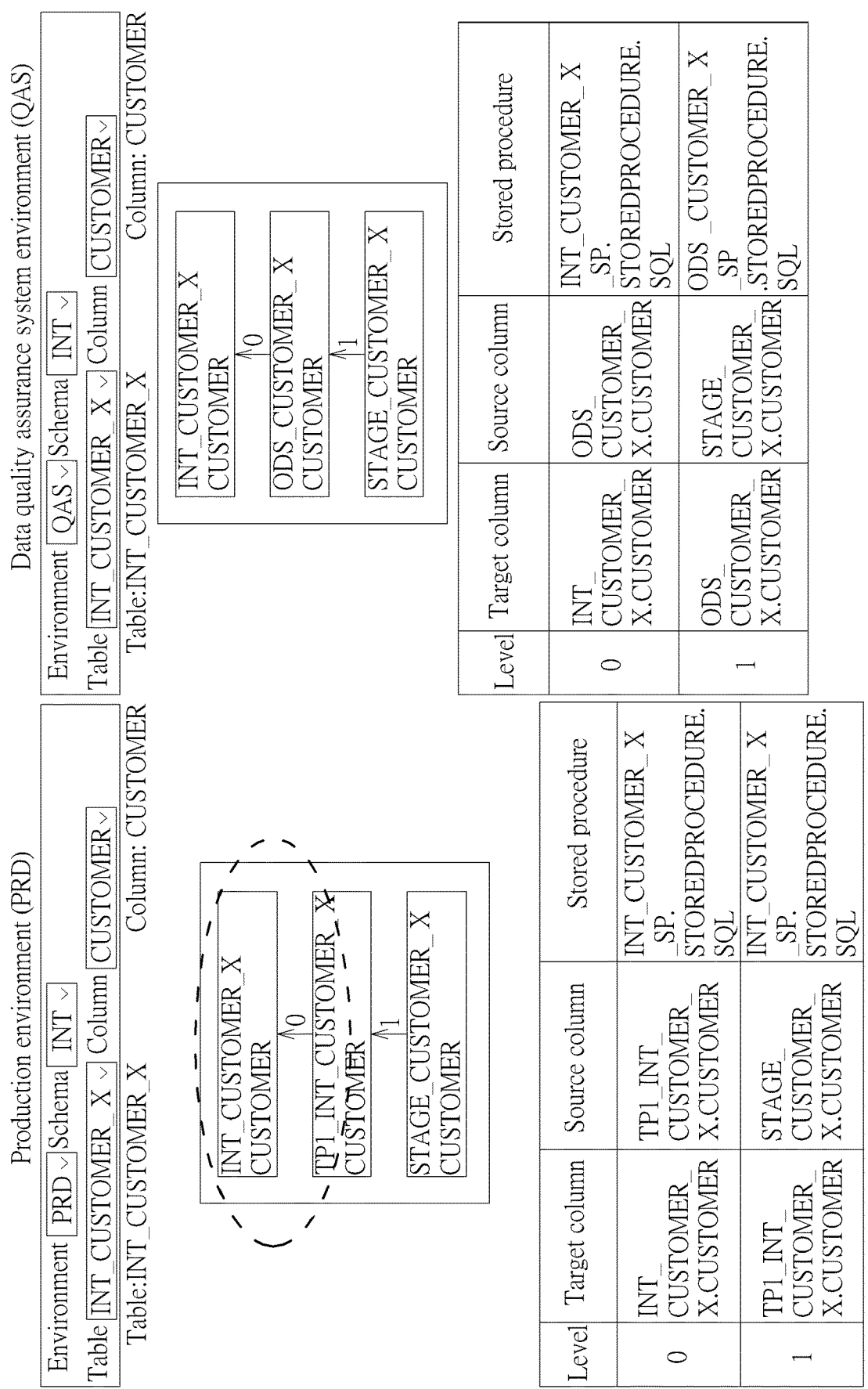
FIG. 9 is a schematic diagram illustrating comparison of column lineage graphs of the data quality assurance system environment and the production environment according to an embodiment of the present invention.

In Step S110, the embodiments may perform a notification function according to the comparison result. When the comparison result indicates that there is a difference between the column lineage graphs of two of the development environment, the data quality assurance system environment and the production environment, the embodiments may generate and send a notification signal to inform the administrator or engineer of the data center about the difference of the column lineage graphs, so as to execute the notification function. For example, FIG. 8 shows source directed subgraphs corresponding to a column named "INT_CUSTOMER_X.CUSTOMER" of the development environment and the data quality assurance system environment, respectively. FIG. 9 shows source directed subgraphs corresponding to a column named "INT_CUSTOMER_X.CUSTOMER" of and the data quality assurance system environment and the production environment, respectively. As shown in FIG. 8 and FIG. 9, the column "INT_CUSTOMER_X.CUS- TOMER" is the end point of the source directed subgraph in the development environment, the data quality assurance system environment and the production environment. After comparing the column lineage graphs of the development environment, the data quality assurance system environment and the production environment, the comparison results indicates that the data quality assurance system environment and the development environment have the same source directed subgraph, and the source directed subgraph of the production environment is different from the source directed subgraphs of the development environment and the data quality assurance system environment. As shown in FIG. 8, the software engineer selects the development environment and the data quality assurance system environment for comparison in Step S110. The comparison results indicates that the source directed subgraph corresponding to the column "INT_CUSTOMER_X.CUSTOMER" of the data quality assurance system environment is the same as the source directed subgraph corresponding to the column "INT_CUSTOMER_X.CUSTOMER" of the development environment. As shown in FIG. 9, the software engineer selects the data quality assurance system environment and the production environment for comparison in Step S110. The comparison results indicates that the source directed subgraph corresponding to the column "INT_CUSTOMER_X.CUSTOMER" of the production environment is different from the source directed subgraph corresponding to the column "INT_CUSTOMER_X.CUSTOMER" of the data quality assurance system environment. As shown in FIG. 9, the source columns corresponding to the restored stored procedure "INT_CUSTOMER_X_SP.STOREDPROCEDURE.SQL" at level 0 are different. In the production environment, the source column corresponding to the restored stored procedure "INT_CUSTOMER_X_SP.STOREDPROCEDURE.SQL" at level 0 is the column "TP1_INT_CUSTOMER_X.CUSTOMER". In the data quality assurance system environment, the source column corresponding to the restored stored procedure "INT_CUSTOMER_X_SP.STOREDPROCEDURE.SQL" at level 0 is the column "ODS_CUSTOMER_X.CUSTOMER". This means that the restored stored procedure update deployment operation of the production environment may be wrong or abnormal, or have not yet been executed. As such, the comparison result indicates that a difference exists between the source directed subgraphs of the column lineage graph of the data quality assurance system environment and the production environment. Since the comparison results indicates that a difference exists between the source directed subgraphs of the column lineage graph of the data quality assurance system environment and the production environment, a notification signal may be generated and sent to notify the administrator or software engineer of the data center about the difference between the data quality assurance system environment and the production environment, so as to perform the notification function. In this way, the administrator or software engineer of the data center may easily and immediately determine whether there is an error situation occurred according to the notification signal.

Therefore, during the development phase of application service, when adding or modifying the restored stored procedures in the development environment, the software engineer may compare the column lineage graph of the development environment with the column lineage graph of the data quality assurance system environment to determine whether or not there is a difference between the development environment and the data quality assurance system environment, so as to ensure the correctness and accuracy of whole system after adding or modifying the restored stored procedures and also greatly improve the timeliness and efficiency of application service development. During the restored development phase of application service, as the amended restored stored procedures are updated and deployed into the production environment, the software engineer may compare the column lineage graph of the production environment with the column lineage graph of the data quality assurance system environment to determine whether or not there is a difference between the production environment and the data quality assurance system environment, to identify whether the update deployment process of the restored stored procedures for the production environment is executed correctly and successfully. Accordingly, when an error occurs in the update deployment process of the restored stored procedures for the production environment, the embodiments may quickly find out the stored procedure to be affected. In an embodiment, a monitoring period may be set (e.g., the monitoring period may be every day, every week or every specific period), such that the data center may execute the steps of the procedure 10 every monitoring period to compare the column lineage graphs of the development environment, the data quality assurance system environment and the production environment and send the comparison results back to the data center, thus providing an automatic test and notification mechanism for the software engineers of the data center, avoiding manual input errors and realizing automatic testing. Meanwhile, the automatic testing would also significantly improve the efficiency of the production testing process.

Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system or combination thereof. Examples of hardware can include analog, digital and/or mixed circuits known as microcircuit, microchip, or silicon chip. For example, the hardware may include application-specific integrated circuit (ASIC), field programmable gate array (FPGA), programmable logic device, coupled hardware components or combination thereof. In another example, the hardware may include general-purpose processor, microprocessor, controller, digital signal processor (DSP) or combination thereof. Examples of the software may include set(s) of codes, set(s) of instructions and/or set(s) of functions retained (e.g., stored) in a storage device, e.g., a non-transitory computer-readable medium. The non-transitory computer-readable storage medium may include read-only memory (ROM), flash memory, random access memory (RAM), subscriber identity module (SIM), hard disk, floppy diskette, or CD-ROM/DVD-ROM/BD-ROM, but not limited thereto. The embodiments of the invention may include a data processing device, and the data processing device may include a processing circuit and a storage device. Any of the abovementioned procedures and examples above may be compiled into program codes or instructions that are stored in the storage device or a computer-readable medium. The processing circuit may read and execute the program codes or the instructions stored in the storage device storage device or computer-readable medium for realizing the abovementioned functions.

To sum up, the embodiments of the present invention convert the stored procedures using wildcards into restored stored procedures with complete column information, such that no columns may be ignored and the column lineage relationship may be parsed correctly in the following column lineage parsing process. Moreover, the data processing method of the embodiments of the present invention may obtain the column lineage graphs of each environment. When the software engineer develops the application service for the data center, the difference of the column lineage graphs in various environments may be obtained real time by comparison, thereby effectively improving the correctness and timeliness of the system while modifying the stored procedures, identifying whether the stored procedure update process of the production environment is executed correctly, and greatly improving and optimizing the speed of digital transformation for company.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing method, applied in a data center, comprising:
   obtaining stored procedures of a development environment, a data quality assurance system environment and a production environment and column information of all tables from the data center;
   for each stored procedure, analyzing the stored procedure and determining whether the stored procedure contains a wildcard;
   for each stored procedure, converting and restoring the stored procedure into a restored stored procedure with complete column information based on the wildcard;
   generating column lineage graphs of the development environment, the data quality assurance system environment and the production environment respectively according to the restored stored procedures of the development environment, the data quality assurance system environment and the production environment, comprising:
      parsing each restored stored procedure to determine directed graphs of all columns of the restored stored procedure for each environment of the development environment, the data quality assurance system environment and the production environment; and
      merging directed graphs of columns of all restored stored procedures in each environment to generate a column lineage graph for each environment; and
   comparing the column lineage graphs of the development environment, the data quality assurance system environment and the production environment to generate a comparison result and performing a notification function according to the comparison result.

2. The data processing method of claim 1, wherein the step of for each stored procedure converting and restoring the stored procedure into the restored stored procedure with complete column information based on the wildcard comprises:
   analyzing contextual information of the wildcard in the stored procedure to determine whether the wildcard is included in a selection query statement;
   when determining that the wildcard is in the selection query statement, determining a specified table to be queried in the selection query statement, wherein the selection query statement comprises a first clause and a second clause, the second clause is after the first clause, and the wildcard is in the first clause of the selection query statement, wherein the step comprises determining the specified table to be queried from the second clause of the selection query statement;
   comparing the specified table with the obtained column information of all tables to determine all column information corresponding to the specified table; and
   replacing the wildcard in the stored procedure with all column information corresponding to the specified table to generate the restored stored procedure with complete column information.

3. The data processing method of claim 1, wherein the step of for each stored procedure, converting and restoring the stored procedure into the restored stored procedure with complete column information based on the wildcard comprises:
   for each stored procedure, when determining that the stored procedure does not contain any wildcard, the stored procedure is outputted as the restored stored procedure.

4. The data processing method of claim 1, wherein the step of merging the directed graphs of the columns of all restored stored procedures in each environment to generate the column lineage graph for each environment comprises:
   when determining that a source column of a first restored stored procedure and a target column of a second restored stored procedure are the same column, merging a first node representing the source column of the first restored stored procedure and a second node representing the target column of the second restored stored procedure.

5. The data processing method of claim 1, wherein the step of comparing the column lineage graphs of the development environment, the data quality assurance system environment and the production environment to generate the comparison result and performing the notification function according to the comparison result comprises:
   comparing the column lineage graphs of at least two environments, source directed subgraphs or target directed subgraphs corresponding to at least one column of the column lineage graphs of at least two environments among the development environment, the data quality assurance system environment and the production environment to generate the comparison result; and
   when the comparison result indicates that there is a difference between the column lineage graphs of two of the development environment, the data quality assurance system environment and the production environment, generating and sending a notification signal to execute the notification function.

6. A data processing device, applied in a data center, comprising:
   a storage device, configured to store instructions;
   a processor circuit, configured to execute the instructions of:
   obtaining stored procedures of a development environment, a data quality assurance system environment and a production environment and column information of all tables from the data center;
   for each stored procedure, analyzing the stored procedure and determining whether the stored procedure contains a wildcard;
   for each stored procedure, converting and restoring the stored procedure into a restored stored procedure with complete column information based on the wildcard;

generating column lineage graphs of the development environment, the data quality assurance system environment and the production environment respectively according to the restored stored procedures of the development environment, the data quality assurance system environment and the production environment, comprising:

parsing each restored stored procedure to determine directed graphs of all columns of the restored stored procedure for each environment of the development environment, the data quality assurance system environment and the production environment; and merging directed graphs of columns of all restored stored procedures in each environment to generate a column lineage graph for each environment; and comparing the column lineage graphs of the development environment, the data quality assurance system environment and the production environment to generate a comparison result and performing a notification function according to the comparison result.

7. The data processing device of claim 6, wherein the instructions further comprise:

analyzing contextual information of the wildcard in the stored procedure to determine whether the wildcard is included in a selection query statement;

when determining that the wildcard is in the selection query statement, determining a specified table to be queried in the selection query statement, wherein the selection query statement comprises a first clause and a second clause, the second clause is after the first clause, and the wildcard is in the first clause of the selection query statement, wherein the step comprises determining the specified table to be queried from the second clause of the selection query statement;

comparing the specified table with the obtained column information of all tables to determine all column information corresponding to the specified table; and replacing the wildcard in the stored procedure with all column information corresponding to the specified table to generate the restored stored procedure with complete column information.

8. The data processing device of claim 6, wherein the instructions further comprise:

for each stored procedure, when determining that the stored procedure does not contain any wildcard, the stored procedure is outputted as the restored stored procedure.

9. The data processing device of claim 6, wherein the instructions further comprise:

when determining that a source column of a first restored stored procedure and a target column of a second restored stored procedure are the same column, merging a first node representing the source column of the first restored stored procedure and a second node representing the target column of the second restored stored procedure.

10. The data processing device of claim 6, wherein the instructions further comprise:

comparing the column lineage graphs of at least two environments, source directed subgraphs or target directed subgraphs corresponding to at least one column of the column lineage graphs of at least two environments among the development environment, the data quality assurance system environment and the production environment to generate the comparison result; and when the comparison result indicates that there is a difference between the column lineage graphs of two of the development environment, the data quality assurance system environment and the production environment, generating and sending a notification signal to execute the notification function.

\* \* \* \* \*